US008781002B2

(12) United States Patent
Dumitras et al.

(10) Patent No.: US 8,781,002 B2
(45) Date of Patent: Jul. 15, 2014

(54) METHOD AND APPARATUS FOR IMPROVED CODING MODE SELECTION

(75) Inventors: Adriana Dumitras, Sunnyvale, CA (US); Barin Geoffry Haskell, Mountain View, CA (US); Atul Puri, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1153 days.

(21) Appl. No.: 11/671,463

(22) Filed: Feb. 5, 2007

(65) Prior Publication Data
US 2007/0127579 A1 Jun. 7, 2007

Related U.S. Application Data

(63) Continuation of application No. 10/614,929, filed on Jul. 7, 2003, now Pat. No. 7,194,035.

(60) Provisional application No. 60/439,062, filed on Jan. 8, 2003.

(51) Int. Cl.
*H04N 7/12* (2006.01)

(52) U.S. Cl.
USPC .................................................. 375/240.26

(58) Field of Classification Search
CPC .............................................. H04N 19/00351
USPC ........................... 375/240.01, 240.16, 240.26
IPC ....................................................... H04N 7/12
See application file for complete search history.

(56) References Cited

U.S. PATENT DOCUMENTS

| 5,691,770 A | 11/1997 | Keesman et al. |
| 5,778,192 A | 7/1998 | Schuster et al. |
| 5,790,131 A | 8/1998 | Liang et al. |
| 5,801,779 A | 9/1998 | Uz et al. |
| 5,867,221 A | 2/1999 | Pullen et al. |
| 5,872,598 A | 2/1999 | Legall et al. |
| 5,923,376 A | 7/1999 | Pullen et al. |
| 5,929,916 A | 7/1999 | Legall et al. |
| 6,049,629 A | 4/2000 | Hirabayashi |
| 6,111,991 A | 8/2000 | Ribas-Corbera et al. |

(Continued)

FOREIGN PATENT DOCUMENTS

| CN | 1157079 | 8/1997 |
| CN | 1157080 | 8/1997 |

(Continued)

OTHER PUBLICATIONS

ISO/IEC 14496-10, "Advanced Video Coding: H.264/AVC—reference software," 2002.

(Continued)

*Primary Examiner* — Young Lee
(74) *Attorney, Agent, or Firm* — Adeli LLP

(57) ABSTRACT

Some embodiments provide a method for selecting an encoding mode from several encoding modes. For each encoding mode from several encoding modes, the method computes a Lagrangian value based on a distortion value that is identified by using a function that reduces the impact of outliers. The method selects a particular encoding mode based on the computed Lagrangian values. In some embodiments, the function is a Huber function. In some embodiments, the computed Lagrangian value is further based on a bit rate value and a Lagrangian multiplier.

16 Claims, 4 Drawing Sheets

(56) References Cited

U.S. PATENT DOCUMENTS

| | | | |
|---|---|---|---|
| 6,148,107 | A | 11/2000 | Ducloux et al. |
| 6,278,735 | B1 | 8/2001 | Mohsenian |
| 6,414,992 | B1 | 7/2002 | Sriram et al. |
| 6,490,320 | B1 | 12/2002 | Vetro et al. |
| 6,493,385 | B1 | 12/2002 | Sekiguchi et al. |
| 6,493,386 | B1 | 12/2002 | Vetro et al. |
| 6,574,279 | B1 | 6/2003 | Vetro et al. |
| 6,760,482 | B1 | 7/2004 | Taubman |
| 6,856,699 | B1 | 2/2005 | Olivieri |
| 6,925,119 | B2 | 8/2005 | Bartolucci et al. |
| 6,975,680 | B2 * | 12/2005 | Demos ............... 375/240.26 |
| 7,031,387 | B2 | 4/2006 | Jeon |
| 7,042,943 | B2 | 5/2006 | Haskell et al. |
| 7,072,397 | B2 | 7/2006 | Sriram et al. |
| 7,194,035 | B2 | 3/2007 | Dumitras et al. |
| 7,822,118 | B2 | 10/2010 | Haskell et al. |
| 2003/0179826 | A1 | 9/2003 | Jeon |
| 2003/0202580 | A1 | 10/2003 | Noh et al. |
| 2004/0114817 | A1 | 6/2004 | Jayant et al. |
| 2004/0131121 | A1 | 7/2004 | Dumitras et al. |
| 2004/0184546 | A1 | 9/2004 | Haskell et al. |
| 2006/0193382 | A1 | 8/2006 | Haskell et al. |
| 2010/0329333 | A1 | 12/2010 | Haskell et al. |

FOREIGN PATENT DOCUMENTS

| | | |
|---|---|---|
| CN | 1176562 | 3/1998 |
| CN | 1292978 | 4/2001 |
| EP | 1170954 A1 | 1/2002 |
| EP | 1170954 A1 | 9/2002 |
| EP | 1 563 688 | 8/2005 |
| EP | 1 584 200 | 10/2005 |
| EP | 1 933 569 | 6/2008 |
| EP | 1 936 995 | 6/2008 |
| EP | 2271104 | 1/2011 |
| JP | 2003-299102 | 10/2003 |
| KR | 10-0305941 | 10/1999 |
| KR | 2001-0053002 | 6/2001 |
| KR | 2003-0082818 | 10/2003 |
| WO | 96/34495 | 10/1996 |
| WO | WO 96/34495 | 10/1996 |
| WO | WO 96/34496 | 10/1996 |
| WO | WO 99/66734 | 12/1999 |
| WO | 02/089489 | 11/2002 |
| WO | WO 02/089489 | 11/2002 |
| WO | 2004/045218 | 5/2004 |
| WO | 2004/064414 | 9/2004 |

OTHER PUBLICATIONS

Adriana Dumitra and Barry G. Haskell, "Enhancement of direct mode selection in B pictures for bit rate reduction of compressed movie sequences," in Proceedings of IEEE Intl. Conference on Image Processing, 2003, Barcelona, Spain.

Chen, P. Zhou, and Y. He, "Fast motion estimation for JVT," ISO/IEC JTC 1/SC29/WG11 and ITU—T SG16 Q.6, document JVT—G016, 2003.

Michael Horowitz, Anthony Joch, and F. Kossentini, "H.264/AVC Baseline Profile Decoder Complexity Analysis," IEEE Trans. on Circuits and Systems for Video Technology, vol. 13, No. 7, pp. 704-716, Jul. 2003.

Kwong-Keung Leung, Nelson H.C. Yung, Paul Y.S. Cheung, "Parallelization methodology for video coding—an implementation on TMS32OC8O," IEEE Trans. on Circuits and Systems for Video Technology, vol. 10, No. 8, pp. 1413-1425, Dec. 2000.

Non-Final Office Action of U.S. Appl. No. 10/615,117, Jun. 17, 2005 (mailing date), Haskell, Brian.

Non-Final Office Action of U.S. Appl. No. 10/614,929, Jun. 13, 2005 (mailing date), Dumitras, Adriana.

Final Office Action of U.S. Appl. No. 10/614,929, Jan. 11, 2006 (mailing date), Dumitras, Adriana.

International Search Report for PCT/US2003/034659, Mar. 11, 2004 (mailing date), Apple Computer.

Written Opinion for PCT/US2003/034659, Sep. 13, 2005 (mailing date), Apple Computer.

International Preliminary Examination Report for PCT/US2003/034659, Apr. 25, 2006 (completion), Apple Computer.

International Preliminary Report on Patentability for PCT/US2004/000316, Dec. 28, 2006 (completion), Apple Computer.

Written Opinion for PCT/US2004/000316, Jul. 8, 2005 (issuance), Apple Computer.

International Search Report for PCT/US2004/000316, Oct. 1, 2004 (mailing date), Apple Computer.

Partial International Search Report for PCT/US2004/000316, Jul. 5, 2004 (mailing date), Apple Computer.

Choi, J., et al., "A Stable Feedback Control of the Buffer State Using the Controlled Language Multiplier Method," *IEEE Transactions on Image Processing*, Sep. 1, 1994, pp. 546-558, vol. 3 No. 5, IEEE Inc., New York, US.

Dumitras, A., et. al., "Enhancement of Direct Mode Selection in B Pictures for Bit Rate Reduction of Compressed Video Sequences," *2003 International Conference on Image Processing*, Sep. 14, 2003, pp. 825-828, vol. 3, IEEE, US.

Kossentini, F., et. al., "Predictive RD Optimized Motion Estimation for Very Low Bit-Rate Coding," *IEEE Journal on Selected Areas in Communications*, Dec. 1, 1997, pp. 1752-1763, vol. 15, No. 9, IEEE Inc., New York, US.

Lee, W. Y., et al., "Fast Algorithm for Optimal Bit Allocation in a Rate-Distortion Sense," *Electronics Letters*, Sep. 26, 1996, pp. 1871-1873, vol. 32 No. 20, Stevenage, Herts, GB.

Ortega, A. and Ramchandran, K., "Rate-Distortion Methods for Image and Video Compression," IEEE Signal Processing Magazine, pp. 23-50, Nov. 1998.

Schwarz, H., et. al., "An Improved H.26L Coder Using Lagrangian Coder Control," *ITU Telecommunications Standardization Sector Study Group 16*, Oct. 18, 2001, pp. 1-8, (whole document).

Segall C. A., et. al., "Pre- and Post-Processing Algorithms for Compressed Video Enhancement," *Conference Record of the 34th Asilomar Conference on Signals, Systems, & Computers*, Oct. 29, 2000, pp. 1369-1373, vol. 2 of 2, conf. 34, IEEE, US.

Seungjoon, Yang, et. al., "Blocking Effect Removal Using Regularization and Dithering," *1998 International Conference on Image Processing*, Oct. 4, 1998, pp. 415-419, IEEE Comput. Soc., US.

Shen, Mei-Yin, et. al., "Fast Compression Artifact Reduction Technique Based on Nonlinear Filtering," *Proceedings of the 1999 IEEE International Symposium on Circuits and Systems*. May 30, 1999, pp. 179-182, IEEE, US.

Shen, Mei-Yin, et. al., "Real-time Compression Artifact Reduction Via Robust Nonlinear Filtering," *1999 International Conference on Image Processing*, Oct. 24, 1999, pp. 565-569, IEEE, US.

Sullivan, G. J. and Wiegand, T., "Rate-Distortion Optimization for Video Compression," IEEE Signal Processing Magazine, vol. 15 No. 6, pp. 74-90, Nov. 1998.

Wiegand T., et. al., "Lagrange Multiplier Selection in Hybrid Video Coder Control," *Proceedings 2001 International Conference on Image Processing*. Oct. 7, 2001, pp. 542-545, vol. 1 of 3, conf. 8, IEEE, US.

Yang, Y., et al., "Rate-Distortion Optimizations for Region and Object Based Wavelet Video Coding," *Conference Record of the 34th Asilomar Conference on Signals, Systems & Computers*, Oct. 29, 2000, pp. 1363-1368, vol. 2 of 2 Conf 34, IEEE, New York, US.

Zhu Q.-F., et. al., "Image Reconstruction for Hybrid Video Coding Systems," *Data Compression Conference*, Mar. 24, 1992, pp. 229-238, IEEE Comput. Soc., US.

Rob Koenen, "Overview of the MPEG-4 standard," in ISO/IEC JTC1/SC29/WG11 N4668, Mar. 2002.

Antonio Ortega and R. Ramchandran, "Rate-Distortion methods for image and video compression," IEEE Signal Processing Magazine, vol. 15, No. 6, pp. 23-50, Nov. 1998.

Thomas Wiegand, M. Lightstone, D. Mukherjee, T.G. Campbell, and S.K. Mitra, "Rate-distortion optimized mode selection for very low bit rate video coding and the emerging H.263 standard," IEEE Trans. on Circuits and Systems for Video Technology, vol. 6, No. 2, pp. 182-190, Apr. 1996.

(56) References Cited

OTHER PUBLICATIONS

Gary J. Sullivan and Thomas Wiegand, "Rate-distortion optimization for video compression," IEEE Signal Processing Magazine, vol. 15, No. 6, pp. 74-90, Nov. 1998.
Bernd Girod, "Rate-Constrained motion estimation," in Proc. SPIE Conference on Visual Communications and Image Processing, Chicago, IL, USA, 1994, vol. 2308, pp. 1026-1034.
Michael Gallant, G. Cote, and F. Kossentini, "An efficient computation-constrained block-based motion estimation algorithm for low bit rate video coding," IEEE Trans. on Circuits and Systems for Video Technology, vol. 8, No. 12, pp. 1816-1823, Dec. 1999.
Michael Chen and A.N. Wilson, "Rate-Distortion optimal motion estimation algorithms for motion-compensated transform video coding," IEEE Trans. on Circuits and Systems for Video Technology, vol. 8, No. 2, pp. 147-158, Apr. 1998.
Dzung T. Hoang, P.M Long, and J.S. Vitter, "Efficient cost measures for motion estimation at low bit rates," IEEE Trans. on Circuits and Systems for Video Technology, vol. 8, No. 4, pp. 488-500, Aug. 1998.
Alexis M. Tourapis, O.C. Au, and M.L. Liou, "Highly efficient predictive zonal algorithms for fast block-matching motion estimation," IEEE Trans. on Circuits and Systems for Video Technology, vol. 12, No. 10, pp. 934-947, Oct. 2002.
Liang-Jin Lin and A. Ortega, "Bit-rate control using piecewise approximated Rate-Distortion characteristics," IEEE Trans. on Circuits and Systems for Video Technology, vol. 8, No. 4, pp. 446-459, Aug. 1998.
Jungwoo Lee and Bradley W. Dickinson, "Rate-distortion optimized frame type selection for MPEG encoding," IEEE Trans. on Circuits and Systems for Video Technology, vol. 7, No. 3, pp. 501-510, Jun. 1997.
Po-Yuen Cheng, J.Li, and C.-C.J. Kuo, "Rate control for and embedded wavelet video coder," IEEE Trans. on Circuits and Systems for Video Technology, vol. 7, No. 4, pp. 696-702, Aug. 1997.
Kuo-Chin Fan and K.-S. Kan, "An active scene analysis-based approach for pseudoconstant bit-rate video coding," IEEE Trans. on Circuits and Systems for Video Technology, vol. 8, No. 2, pp. 159-170, Apr. 1998.
Anthony Vetro, H. Sun, and Y. Wang, "MPEG-4 rate control for multiple object coding," IEEE Trans. on Circuits and Systems for Video Technology, vol. 9, No. 1, pp. 186-199, Feb. 1999.
Jose I. Ronda, F. Jaureguizar, and N. Garcia, "Rate control and bit allocation for MPEG-4," IEEE Trans. on Circuits and Systems for Video Technology, vol. 9, No. 8, pp. 1243-1258, Dec. 1999.
Hung-Ju Lee, T. Chiang, and Y.-Q. Zhang, "Scalable rate control for MPEG-4 video," IEEE Trans. on Circuits and Systems for Video Technology, vol. 10, No. 6, pp. 878-894, Sep. 2000.
Jeong-Woo Lee, A. Vetro, Y. Wang, and Y.-S. Ho, "Bit allocation for MPEG-4 video coding with spatial-temporal tradeoffs," IEEE Trans. on Circuits and Systems for Video Technology, vol. 13, No. 6, pp. 488-502, Jun. 2003.
Unity of Invention for EP Application 04700631.7, Feb. 23, 2009 (mailing date), Apple Inc.
Ashish Jagmohan and K. Ratakonda, "MPEG-4 one-pass VBR rate control for digital storage," IEEE Trans. on Circuits and Systems for Video Technology, vol. 13, No. 5, pp. 447-452, May 2003.
Feng Pan, Z. Li, K. Lim, and G. Feng, "A study of MPEG-4 rate control scheme and its improvements," IEEE Trans. on Circuits and Systems for Video Technology, vol. 13, No. 5, pp. 440-446, May 2003.
ISO/IEC 14496-10, "Information technology—coding of audio-visual objects—Part 10: Advanced video coding"; also ITU-T Recommendation H.264: "Advanced video coding for generic audiovisual services", 2003.
Multiple authors, "Special issue on the H.264/AVC video coding standard," IEEE Trans. on Circuits and Systems for Video Technology, vol. 13, No. 7, Jul. 2003.
Thomas Wiegand, H. Schwarz, A. Joch, F. Kossentini, and G.J. Sullivan, "Rate-constrained coder control and comparison of video coding standards," IEEE Trans. on Circuits and Systems for Video Technology, vol. 13, No. 7, pp. 688-703, Jul. 2003.
Takagi, Takishima and Nakajima, "A Study of a Rate Control Scheme for a JVT coder", Institute of Electronics, Information and Communication Engineers, Technical Report of IEICE, Nov. 2002, pp. 123-126.
Non-Final Office Action of U.S. Appl. No. 11/344,591, Jun. 17, 2009 (mailing date), Haskell, Brian G., et al.
Restriction Requirement of U.S. Appl. No. 11/344,591, Feb. 25, 2009 (mailing date), Haskell, Barin G., et al.
Notice of Allowance of U.S. Appl. No. 10/615,117, Oct. 27, 2005 (mailing date), Haskell, Brian G., et al.
Notice of Allowance of U.S. Appl. No. 10/614,929, Oct. 26, 2006 (mailing date), Dumitras, Adriana, et al.
European Patent Office Communication pursuant to Article 94(3) EPC of 04700631.7, Feb. 23, 2009 (mailing date), Apple Inc.
European Patent Office Communication pursuant to Article 94(3) EPC of 03778014.5, Apr. 11, 2006 (mailing date), Apple Inc.
European Patent Office Communication pursuant to Article 94(3) EPC of 03778014.5, Mar. 9, 2009 (mailing date), Apple Inc.
Antonio Ortega, R. Ramchandran, and M. Vetterli, "Optimal trellis-based buffered compression and fast approximation," Jan. 1994, pp. 26-40, vol. 3, IEEE Trans. on Image Processing.
Markus Flierl, T. Wiegand, and B. Girod, "Rate-constrained multi hypothesis prediction for motion-compensated video compression," Nov. 2002, pp. 957-969, vol. 12, No. 11, IEEE Trans. on Circuits and Systems for Video Technology.
Zhihai He and S.K. Mitra, "Optimum bit allocation and accurate rate control for video coding via p-domain source modeling," Oct. 2002, pp. 840-849, vol. 12, No. 10, IEEE Trans. on Circuits and Systems for Video Technology.
Atul Pun and R. Aravind, "Motion-compensated video coding with adaptive perceptual quantization," Dec. 1991, pp. 351-361, vol. 1, No. 4, IEEE Trans. on Circuits and Systems for Video Technology.
Sanghoon Lee, M.S. Pattichis, and A.C. Bovik, "Foveated video compression with optimal rate control," Jul. 2001, pp. 977-992, vol. 10, No. 7, IEEE Trans. on Image Processing.
Supavadee Aramvith, I.-M. Pao, and M.-T. Sun, "A rate-control Scheme for video transport over wireless channels," Nov. 2001, pp. 569-580, vol. 11, No. 5, IEEE Trans. on Circuits and Systems for Video Technology.
Ming Pao and M.-T. Sun, "Encoding stored video for streaming applications," Feb. 2001, pp. 199-209, vol. 11, No. 2, IEEE Trans. on Circuits and Systems for Video Technology.
Jordin Ribas-Corbera and S. Lei, "Rate control in DCT video coding for low-delay communications," Feb. 1999, pp. 172-185, vol. 9, No. 1, IEEE Trans. on Circuits and Systems for Video Technology.
Markus Flierl, and B. Girod, "Generalized B pictures and the Draft H.264/AVC video compression standard," Jul. 2003, pp. 587-597, vol. 13, No. 7, IEEE Trans. on Circuits and Systems for Video Technology.
U.S. Appl. No. 12/795,650, filed Jun. 7, 2010, Haskell, Barin G., et al.
Updated portions of prosecution history for U.S. Appl. No. 10/615,117, Sep. 19, 2005, Haskell, Barin G., et al.
Updated portions of prosecution history for U.S. Appl. No. 11/344,591, May 17, 2010, Haskell, Barin G., et al.
Portions of prosecution history for U.S. Appl. No. 12/795,650, Sep. 13, 2010, Haskell, Barin G., et al.
Updated portions of prosecution history for U.S. Appl. No. 10/614,929, Oct. 16, 2006, Dumitras, Adriana, et al.
EP Search Report of EP 08 00 5751.6, May 25, 2010 (mailing date), Apple Computer, Inc.
EP Office Action of EP 04 700 631.7, Aug. 6, 2010 (mailing date), Apple Computer, Inc.
EP Partial Search Report of EP 08 00 5958.7, Aug. 6, 2010 (mailing date), Apple Computer, Inc.
Updated portions of prosecution history of U.S. Appl. No. 11/344,591, Jun. 24, 2010, Haskell, Barin Geoffry, et al.
Updated portions of prosecution history of EP03778014.5, Jul. 6, 2010 (mailing date), Apple Inc.
Updated portions of prosecution history of EP08005751.6, Sep. 30, 2010 (mailing date), Apple Inc.
Updated portions of prosecution history of EP04700631.7, Dec. 2, 2010 (mailing date), Apple Inc.

(56) References Cited

OTHER PUBLICATIONS

Updated portions of prosecution history of EP08005958.7, Dec. 17, 2010 (mailing date), Apple Inc.
Byeong-Moon, Jeon, et al: "Mode decision for B-pictures in TML-5", ITU, Study Group 16, Question 6, Video Coding Experts Group, 12$^{th}$ Meeting, Jan. 9-12, 2001, pp. 1-3, Eibsee, Germany.
Updated portions of prosecution history of U.S. Appl. No. 12/795,650, Mar. 29, 2012, Haskell, Barin Geoffry, et al.
Updated portions of prosecution history of EP04700631, Feb. 14, 2012 (mailing date), Apple Inc.
Updated portions of prosecution history of EP08005958, Feb. 14, 2012 (mailing date), Apple Inc.
Joint Video Team (JVT) of ISO/IEC MPEG and ITU-T VCEG, "Working Draft No. 2, Revision 2 (WD-2)," Joint Video Team (JVT) of ISO/IEC MPEG and ITU-T VCEG, Jan. 29-Feb. 1, 2002, 106 pages, Geneva, Switzerland, JVT-B118r2.
Updated portions of prosecution history of U.S. Appl. No. 12/795,650, Oct. 17, 2011, Haskell, Barin Geoffry, et al.
Updated portions of prosecution history of EP03778014, Dec. 2, 2010, Apple Inc.
Updated portions of prosecution history of EP08005751, Sep. 23, 2011, Apple Inc.
Updated portions of prosecution history of EP04700631, Aug. 13, 2009, Apple Inc.
Updated portions of prosecution history of EP08005958, Oct. 12, 2011, Apple Inc.
Chiu, Yi-Jen, et al., "A Software-Only Videocodec Using Pixelwise Conditional Differential Replenishment and Perceptual Enhancements," IEEE Transactions on Circuits and Systems for Video Technology, Apr. 1999, pp. 438-450, vol. 9, No. 3.
Chou, Chun-Hsien, et al., "A Perceptually Tuned Subband Image Coder Based on the Measure of Just-Noticeable-Distortion Profile," IEEE Transactions on Circuits and Systems for Video Technology, Dec. 1995, pp. 467-476, vol. 5, No. 6.
He, Zhihai, et al., "A Unified Rate-Distortion Analysis Framework for Transform Coding," IEEE Transactions on Circuits and Systems for Video Technology, Dec. 2001, pp. 1221-1236, vol. 11, No. 12.
He, Zhihai, et al., "Low-Delay Rate Control for DCT Video Coding via p-Domain Source Modeling," IEEE Transactions on Circuits and Systems for Video Technology, Aug. 2001, pp. 928-940, vol. 11, No. 8.
ISO/IEC 14496-10, "Information technology-coding of audio-visual objects—Part 10: Advanced video coding" Oct. 1, 2004 (This reference is submitted to replace item #1 in previously filed 1449 dated Jul. 18, 2008 to correct the publication date from 2002 to Oct. 1, 2004.
Pickering, Mark R., et al., "A Perceptually Efficient VBR Rate Control Algorithm," IEEE Transactions on Image Processing, Sep. 1994, pp. 527-532, vol. 3, No. 5.
Ribas-Corbera, Jordi, et al., "A Frame-Layer Bit Allocation for H.263+," IEEE Transactions on Circuits and Systems for Video Technology, Oct. 2000, pp. 1154-1158, vol. 10, No. 7.
Song, Hwangjun, et al., "Rate Control for Low-Bit-Rate Video via Variable-Encoding Frame Rates," IEEE Transactions on Circuits and Systems for Video Technology, Apr. 2001, pp. 512-521, vol. 11, No. 4.
Tan, K.T., et al., "A Multi-Metric Objective Picture-Quality Measurement Model for MPEG Video," IEEE Transactions on Circuits and Systems for Video Technology, Oct. 2000, pp. 1208-1213, vol. 10, No. 7.
Wiegand, Thomas, "Study of Final Committee Draft of Joint Video Specification (ITU-T Rec. H.264/ISO/IEC 14493-10 AVC)," Dec. 5-13, 2002, Awaji Island, Japan. (JVT-F100).
Yang, Yan, et al., "Rate Control for VBR Video Over ATM: Simplification and Implementation," IEEE Transactions on Circuits and Systems for Video Technology, Sep. 2001, pp. 1045-1058, vol. 11, No. 9.
Non-Final Office Action of U.S. Appl. No. 10/615,117, filed Jun. 17, 2005, Haskill, Barin.
Non-Final Office Action of U.S. Appl. No. 10/614,929, filed Jun. 13, 2005, Dumitras, Adriana.
Final Office Action of U.S. Appl. No. 10/614,929, filed Jun. 11, 2006, Dumitras, Adriana.
International Search Report for PCT/US2003/034659, mailing date Mar. 11, 2004, Apple Computer.
Written Opinion for PCT/US2003/034659, mailing date Sep. 13, 2005, Apple Computer.
EP Search Report of EP 08 00 5751.6, mailing date May 25, 2010, Apple Computer, Inc.
EP Office Action of EP 04 700 631.7, mailing date Aug. 6, 2010, Apple Computer, Inc.
EP Partial Search Report of EP 08 00 5958.7, mailing date Aug. 6, 2010, Apple Computer, Inc.
Schwarz, H., et al., "Lagrangian Coder Control and Comparison of MPEG-4 and H.26L Video Codecs," ITG Fachberichte, Jan. 2002, pp. 301-308, No. 170, VDE Verlag, Berlin, DE.

* cited by examiner

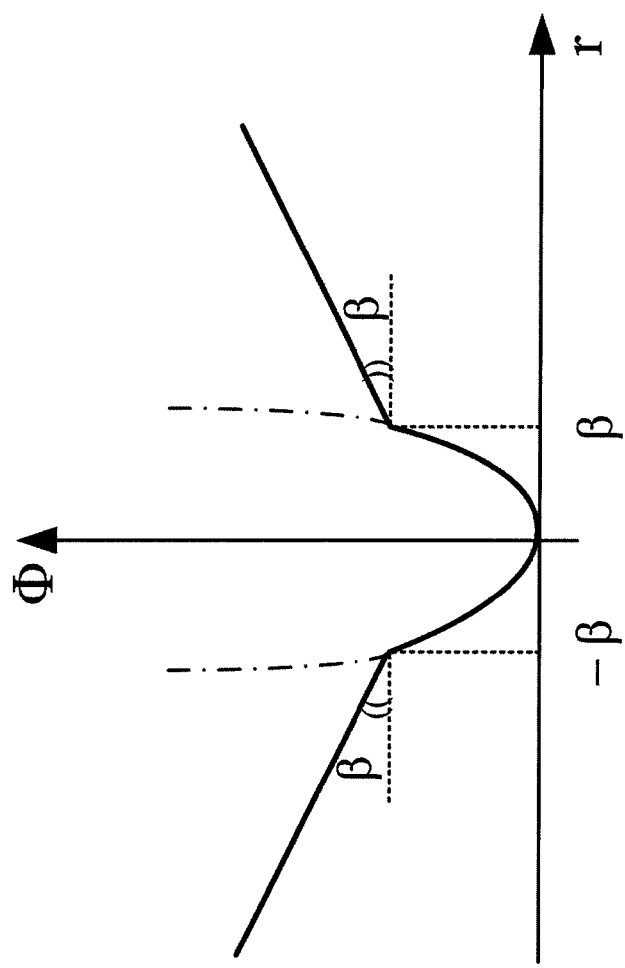

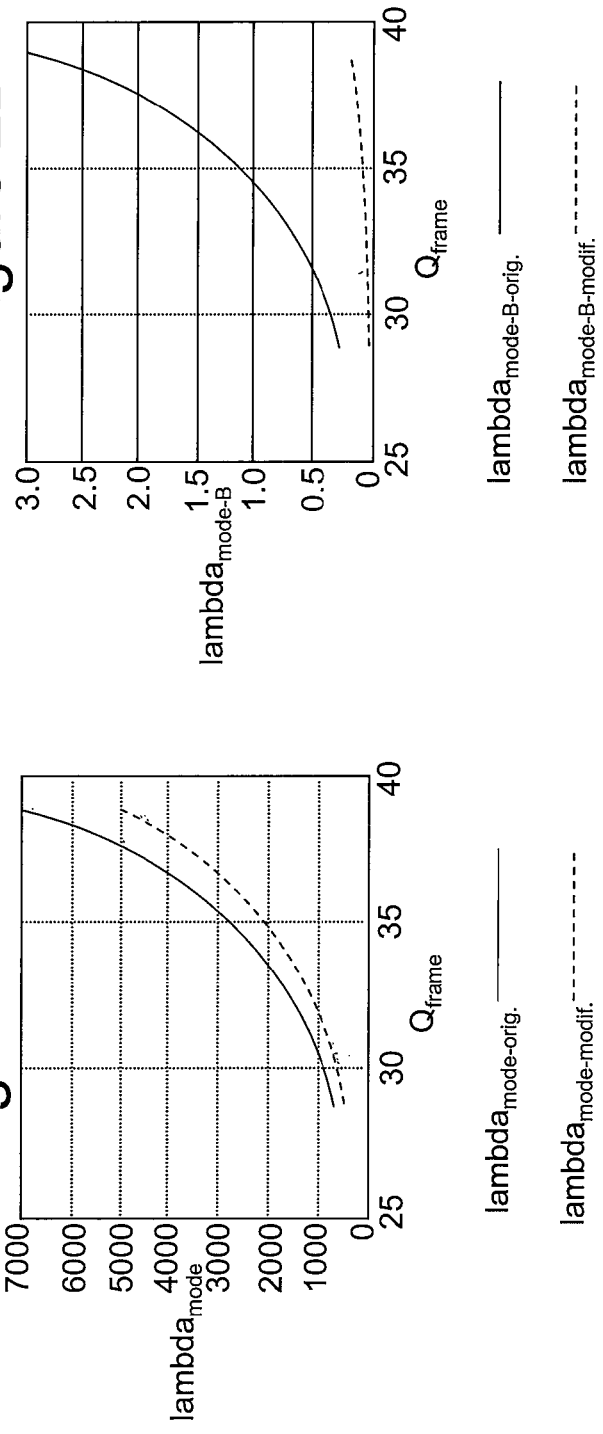

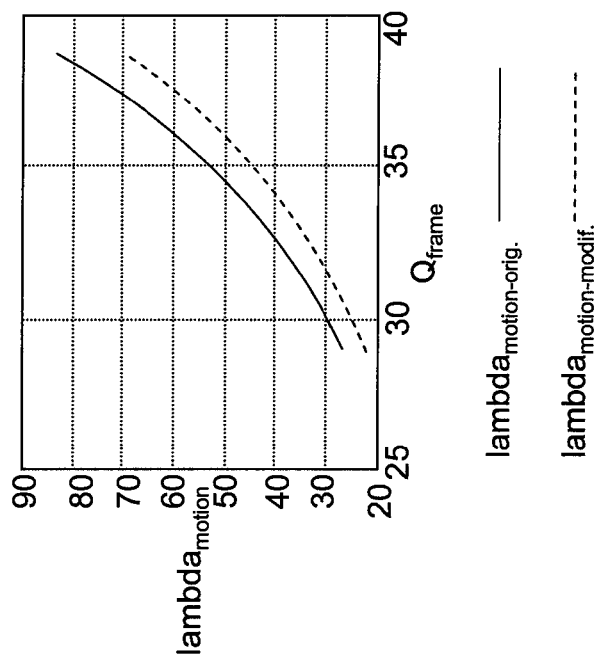

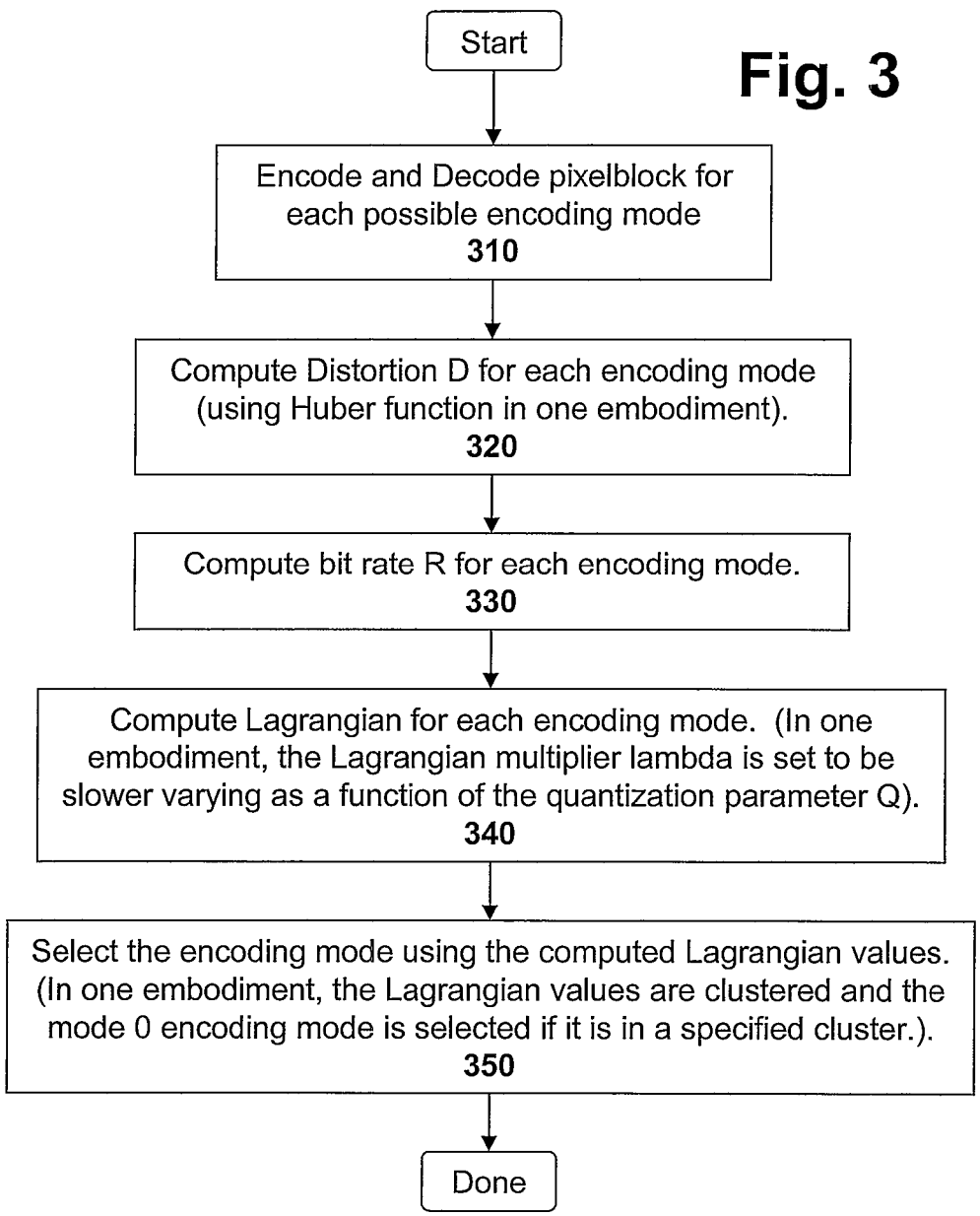

METHOD AND APPARATUS FOR IMPROVED CODING MODE SELECTION

CLAIM OF BENEFIT TO PRIOR APPLICATIONS

This application is a continuation application of U.S. patent application Ser. No. 10/614,929, filed Jul. 7, 2003, now issued as U.S. Pat. No. 7,194,035, which claims priority to U.S. Provisional Patent Application 60/439,062, filed on Jan. 8, 2003. Both U.S. patent application 10/614,929, now issued as U.S. Pat. No. 7,194,035 and U.S. Provisional Patent Application 60/439,062 are incorporated herein by reference.

FIELD OF THE INVENTION

The present invention relates to the field of multi-media compression systems. In particular, the present invention discloses methods and systems for improving the encoding mode selection.

BACKGROUND OF THE INVENTION

Digital based electronic media formats are finally on the cusp of largely replacing analog electronic media formats. Digital compact discs (CDs) replaced analog vinyl records long ago. Analog magnetic cassette tapes are becoming increasingly rare. Second and third generation digital audio systems such as Mini-discs and MP3 (MPEG Audio-layer 3) are now taking market share from the first generation digital audio format of compact discs.

The video media has been slower to move to digital storage and transmission formats than audio. This has been largely due to the massive amounts of digital information required to accurately represent video in digital form. The massive amounts of digital information needed to accurately represent video require very high-capacity digital storage systems and high-bandwidth transmission systems.

However, video is now rapidly moving to digital storage and transmission formats. Faster computer processors, high-density storage systems, and new efficient compression and encoding algorithms have finally made digital video practical at consumer price points. The DVD (Digital Versatile Disc), a digital video system, has been one of the fastest selling consumer electronic products in years. DVDs have been rapidly supplanting Video-Cassette Recorders (VCRs) as the pre-recorded video playback system of choice due their high video quality, very high audio quality, convenience, and extra features. The antiquated analog NTSC (National Television Standards Committee) video transmission system is now being replaced with the digital ATSC (Advanced Television Standards Committee) video transmission system.

Computer systems have been using various different digital video encoding formats for a number of years. Among the best digital video compression and encoding systems used by computer systems have been the digital video systems backed by the Motion Pictures Expert Group commonly known by the acronym MPEG. The three most well known and highly used digital video formats from MPEG are known simply as MPEG-1, MPEG-2, and MPEG-4. Video CDs and consumer-grade digital video editing systems use the early MPEG-1 format. Digital Versatile Discs (DVDs) and the Dish Network brand Direct Broadcast Satellite (DBS) television broadcast system use the MPEG-2 digital video compression and encoding system. The MPEG-4 encoding system is rapidly being adapted by the latest computer based digital video encoders and associated digital video players.

SUMMARY OF THE INVENTION

Methods and systems for improving the encoding mode selection are Disclosed. In this disclosure, a novel method for direct mode enhancement in B-pictures and skip mode enhancement in P-pictures in the framework of H.264 (MPEG-4/Part 10) is disclosed.

Direct mode and skip mode enhancements are achieved by making a number of changes to the existing compression systems. Specifically, the system of the present invention introduces the steps of removing outliers in the distortion values, specifying smaller values for the Lagrangian multiplier in the rate-distortion optimization for encoding mode selection, and clustering the values of the Lagrangian before encoding mode selection. In one embodiment, the Huber cost function is used to compute the distortion for the different encoding modes in order to remove outliers. In one embodiment of the present invention, the system changes the Lagrangian multiplier to vary slower as a function of the Quantizer value Q than the reference H.264 (MPEG-4/Part 10) implementation. The Lagrangian clustering is used to favor mode 0 encoding mode for bit rate reduction.

Experimental results using high quality video sequences show that bit rate reduction is obtained using the method of the present invention, at the expense of a slight loss in peak signal-to-noise ratio (PSNR). By conducting two different experiments, it has been verified that no subjective visual loss is visible despite the peak signal-to-noise ratio change.

In relationship to the existing rate-distortion optimization methods currently employed in the (non-normative) MPEG-4/Part 10 encoder, the method of the present invention represents a simple and useful add-on. More importantly, when other solutions such as further increasing the values of the quantization parameter are not applicable, as inadmissible artifacts would be introduced in the decoded pictures, the method of the present invention achieves bit rate reduction without introducing visible distortion in the decoded sequences.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which:

FIG. 1 graphically illustrates the Huber cost function of a variable r.

FIG. 2A illustrates a variation of original and modified Lagrangian multiplier $\lambda_{mode}$ as a function of the quantization parameter (Q) values in the range of interest.

FIG. 2B illustrates a variation of original and modified Lagrangian multiplier $\lambda_{mode}$ for B-frames as a function of the quantization parameter (Q) values in the range of interest.

FIG. 2C illustrates a variation of original and modified Lagrangian multiplier $\lambda_{motion}$ as a function of the quantization parameter (Q) values in the range of interest.

FIG. 3 illustrates a flow diagram that sets forth how an encoding mode may be selected.

DETAILED DESCRIPTION OF THE PREFERRED EMBODIMENT

A method and system for improving the encoding mode selection is disclosed. In the following description, for purposes of explanation, specific nomenclature is set forth to provide a thorough understanding of the present invention. However, it will be apparent to one skilled in the art that these specific details are not required in order to practice the present invention.

Introduction

The emerging H.264 video encoding standard, also known as MPEG-4/Part 10, Joint Video Team (JVT), Advanced Video Coding (AVC), and H.26L, has been developed jointly by the Motion Picture Experts Group (MPEG) and the International Telecommunication Union (ITU) with the goal to provide higher compression of moving pictures than state-of-art video encoding systems that are compliant with existing MPEG standards. Target applications of H.264, which is expected to become an international standard in 2003, include (but are not limited to) video conferencing, digital storage media, television broadcasting, internet streaming and communication.

Similar to other video encoding standards (in their main body or annexes), the H.264 standard employs a rate-distortion (RD) decision framework. In particular, the H.264 standard employs rate-distortion optimization for encoding mode selection and motion estimation. In this disclosure, the primary focus is on encoding mode selection within the framework of the H.264 standard.

In most digital video encoding systems, each video frame of a video sequence is divided into subsets of pixels, where the subsets of pixels are called pixelblocks. In the H.264 standard, the pixelblocks may have various sizes (The pixelblock with a size equal to 16×16 pixels is traditionally known as a macroblock.). The encoding mode selection problem may be informally defined as "select the best of all possible encoding methods (or encoding modes) to encode each pixelblock in the video frame." The encoding mode selection problem may be solved by the video encoder in a number of different manners. One possible method of solving the encoding mode selection problem is to employ rate-distortion optimization.

There are numerous different encoding modes that may be selected to encode each pixelblock within the framework of the H.264 video encoding standard. Mode 0 is known as 'direct mode' in B-frames and as 'skip mode' in P-frames. Other encoding modes employ pixelblocks of sizes equal to 16×16, 16×8 and 8×16 pixels, 8×8, 8×4, 4×8, 4×4 pixels in B-pictures or P-pictures.

In direct mode (mode 0 in B-pictures), no motion information is transmitted to the decoder. Instead, a predictive system is used to generate motion information. Therefore, the direct mode can provide important bit rate savings for sequences that allow good motion vector predictions using neighboring spatial or temporal information. However, the experimental evaluations have shown that the direct mode selection in H.264 does not yield as many selected pixelblocks as expected for some video sequences.

This disclosure proposes a method for enhancing the direct mode (mode 0) selection in Bidirectional predicted pictures (known as B-pictures or B-frames) within the framework of the H.264 standard. When applied to P-frames, the encoding method of the present invention achieves enhancement of the skip mode (also mode 0) selection. Direct mode and skip mode enhancements are achieved by clustering the Lagrangian values, removing outliers and specifying smaller values of the Lagrangian multiplier in the rate-distortion optimization for the encoding mode selection.

Experimental results using high quality sample video sequences illustrate that the bit rate of the compressed bitstreams from the present invention are reduced as compared to compressed bitstreams obtained using the reference H.264 codec. This bit rate reduction is associated with a slight loss in the peak signal-to-noise ratio (PSNR) of the bitstream. However, two test experiments verify that no subjective visual loss is associated with the change in the peak signal-to-noise ratio. More importantly, when other possible solutions such as further increasing the values of the quantization parameter are not applicable since unacceptable artifacts would be introduced in the decoded pictures the method of the present invention significantly achieves further bit rate reduction without introducing visible distortion in the decoded video sequences. Furthermore, despite the fact that the present invention makes use of the H.264 framework, the encoding method of the present invention is applicable in any video encoding system that employs rate-distortion optimization.

The remainder of this document is organized as follows. A video compression overview section first presents basic ideas related to the rate-distortion optimization framework within the H.264 standard. The encoding method proposed by the present invention is then set forth in detail in the proposed direct mode enhancement method section. Finally, a set of experimental results and conclusions are provided in the experimental results section and the conclusions section, respectively.

Video Compression Overview

As set forth earlier in this document, each video frame is divided into sets of pixelblocks in the H.264 standard. These pixelblocks may be encoded using motion compensated predictive encoding. A predicted pixelblock may be an intra (I) pixelblock (an I-pixelblock) that uses no information from preceding pictures in its encoding, a unidirectionally Predicted (P) pixelblock (a P-pixelblock) that uses information from one preceding picture, or Bidirectionally Predicted (B) pixelblock (a B-pixelblock) that uses information from one preceding picture and one future picture.

For each P-pixelblock in a P-picture, one motion vector is computed. (Note that, within each video picture the pixelblocks may be encoded in many ways. For example, a pixelblock may be divided into smaller sub blocks, with motion vectors computed and transmitted for each subblock. The shape of the subblocks may vary and not be square.) Using the computer motion vector, a prediction pixelblock can be formed by a translation of pixels in the aforementioned previous picture. The difference between the actual pixelblock in the video picture and the prediction pixelblock is then encoded for transmission. (The difference is used to correct minor differences between the predicted pixelblock and the actual pixelblock.)

Each motion vector may also be transmitted via predictive encoding. That is, a prediction for a motion vector is formed using nearby motion vectors that have already been transmitted, and then the difference between the actual motion vector and the predicted motion vector is encoded for transmission.

For each B-pixelblock, two motion vectors are typically computed, one motion vector for the aforementioned previous picture and one for motion vector the future picture. (Note that within a P-picture or B-picture, some pixelblocks may be better encoded without using motion compensation. Such pixels may be encoded as Intra-pixelblocks. Within a B-picture, some pixelblocks may be better encoded using forward or backward unidirectional motion compensation. Such pixels may be encoded as forward predicted or backward predicted depending on whether a previous picture or a future picture is used in the prediction.) From the two B-pixelblock motion vectors, two prediction pixelblocks are computed. The two prediction pixelblocks are then combined together to form a final prediction pixelblock. As above, the difference between the actual pixelblock in the video picture and the prediction block is then encoded for transmission.

As with P-pixelblocks, each motion vector of a B-pixelblock may be transmitted via predictive encoding. That is, a prediction motion vector may be formed using nearby motion vectors that have already been transmitted. Then the difference between the actual motion vector and the prediction motion vector is then encoded for transmission.

However, with B-pixelblocks the opportunity also exists for interpolating the motion vectors from those in the collocated or nearby pixelblocks of the stored pictures. (When the motion vector prediction is constructed using motion vectors of the collocated blocks of the current pixelblock, the direct mode type is known as the temporal direct mode. When the motion vector prediction is constructed using spatial neighbors of the current pixelblock, the direct mode type is known as the spatial direct mode.) The interpolated value may then be used as a prediction motion vector and the difference between the actual motion vector and the prediction motion vector encoded for transmission. Such interpolation is carried out both in the encoder and decoder. (Note that an encoder always has a decoder so the encoder will know exactly how a reconstructed video picture will appear.)

In some cases, the interpolated motion vector is good enough to be used without any correction difference, in which case no motion vector data needs be transmitted at all. This is referred to as Direct Mode in the H.264 (and H.263) standard. Direct mode selection is particularly effective when recording camera is slowly panning across a stationary background. In fact, the motion vector interpolation may be good enough to be used as is, which means that no differential information need be transmitted for these B-pixelblock motion vectors. In skip mode (mode 0 in P-pictures), the motion vector prediction is constructed identically as in the 16×16 direct mode such that no transmission of motion vector bits is carried out.

Prior to transmission, the prediction error (the difference) of a pixelblock or subblock is typically transformed, quantized and entropy encoded to reduce the number of bits. The prediction error, which is computed as the mean square error between the original desired pixelblock and the decoded prediction pixelblock after encoding using direct mode, is encoded in direct mode. However, the prediction error is not encoded and transmitted in skip mode. The subblock size and shape used for the transform may not be the same as the subblock size and shape used for motion compensation. For example, 8×8 pixels or 4×4 pixels are commonly used for transforms, whereas 16×16 pixels, 16×8 pixels, 8×16 pixels or smaller sizes are commonly used for motion compensation. The motion compensation and transform subblock sizes and shapes may vary from pixelblock to pixelblock.

The selection of the best encoding mode to encode each pixelblock is one of the decisions in the H.264 standard that has a very direct impact on the bit rate R of the compressed bitstream, as well as on the distortion D in the decoded video sequence. The goal of encoding mode selection is to select the encoding mode M* that minimizes the distortion $D(\bar{p})$ subject to a bit rate constraint of $R(\bar{p}) \leq R_{max}$, where $\bar{p}$ is the vector of adjustable encoding parameters and $R_{max}$ is the maximum allowed bit rate. This constrained optimization problem may be transformed into an unconstrained optimization problem using the Lagrangian equation $J(\bar{p},\lambda)$ given by:

$$J(\bar{p},\lambda) = D(\bar{p}) + \lambda R(\bar{p}) \qquad (1)$$

where $\lambda$ is the Lagrangian multiplier which controls the rate-distortion tradeoff. The encoding mode decision problem becomes the minimization of $J(\bar{p},\lambda)$. This may be expressed in the following equation:

$$\min_{all\ \bar{p}} \{D(\bar{p}) + \lambda R(\bar{p})\} \qquad (2)$$

The preceding Lagrangian equation may be evaluated by performing the following steps for each admissible encoding mode:

(a) Compute the distortion D as the $L_2$ norm of the error between the original pixelblock and the reconstructed pixelblock after encoding and decoding using a specific encoding mode;

(b) Compute the bit rate R as the total number of bits that are necessary to encode the motion vectors and the transform coefficients;

(c) Compute the Lagrangian J using equation (1);

Finally, the minimum Lagrangian J obtained after computing the Lagrangian J values for all encoding modes indicates the encoding mode M* that solves the minimization expressed by equation (2).

Note that, in the H.264 video compression standard, the encoding mode decision is performed using 8×8 and smaller pixelblocks prior to the encoding mode decision for the larger pixelblocks. Furthermore, note that in an effort to reduce the complexity of the optimization process, the minimization determination is carried out with a fixed Quantizer value Q, and the Lagrange multiplier is often selected to be equal to (for instance) $0.85 \times Q/2$ or $0.85 \times 2^{Q/3}$, where Q is the quantization parameter. For multiple B-pictures, much larger values are often chosen. Of course, this complexity reduction also restricts the search for the minimum value of the Lagrangian J in the rate-distortion plane.

Proposed Direct Mode Enhancement Method

The system of the present invention proposes a method for enhancement of direct mode selection in B-frames and skip mode selection in P-frames. The system of the present invention employs a clustering of cost values, outlier reduction, and specification of the Lagrange multiplier. In one embodiment, the system performs the method using four steps. The following text provides a detailed recitation of these method steps with reference to FIG. 3.

First, the current pixelblock is both encoded and decoded for each possible encoding mode M and the distortion $D_M$ is computed as set forth in steps 310 and 320. In one embodiment, the distortion $D_M$ is computed as the sum of the Huber function values of the errors between the pixels in the original pixelblock and the pixels in the decoded pixelblock. The Huber function, which is illustrated in FIG. 1, is given by the following equation:

$$D_M(x) = \begin{cases} \frac{1}{2}x^2, & |x| \leq \beta \\ \beta|x| - \frac{1}{2}\beta^2, & |x| > \beta \end{cases}$$

where x is the error for one pixel of the pixelblock and $\beta$ is a parameter. Clearly, for error values that are smaller than $\beta$, the value of the Huber function is equal to that given by the square error. For error values that are larger than β, the value of the Huber function is smaller than that of the square error for the same error value.

Second, the bit rate R for each encoding mode is computed as set forth in step 330. In one embodiment, the system computes the bit rate R as the total number of bits that are necessary to encode the motion vectors and transform coefficients of the pixelblock.

Third, the system of the present invention computes the Lagrangian for the encoding mode using equation (1) as set forth in step 340. In one embodiment, the system selects the value of the Lagrangian multiplier λ to be slower varying as a function of the quantization parameter than the original Lagrangian λ proposed in the non-normative part of the H.264 standard version 4.1. The proposed variation of Lagrangian λ as a function of the Quantizer Q is illustrated in FIGS. 2A, 2B, and 2C. By making the Lagrangian multiplier lambda vary slower than the lambda in the reference implementation, the system of the present invention places less emphasis on the bit rate component R of the Lagrangian equation (1) and thus more emphasis on the distortion component D. As a result of this change to the Lagrangian multiplier lambda, slight increases in the bit rate R will have less effect on the output Lagrangian value of J. (This will also reduce the effect of bit rate R has on the Lagrangian cluster set forth in the following paragraph.)

Fourth, let $J_{M^*}$ be the minimum value of J for all $J_M$ (using equation (1)), where M is one of the possible encoding modes. Instead of selecting the encoding mode (M*) as that which yields $J_{M^*}$, the system clusters the values of the computed Lagrangians $J_M$ as follows. Let S be the set of encoding modes k for which the computed Lagrangian values satisfy the condition:

$$S = \left\{ k \left| \frac{J^*}{J_k} \geq \varepsilon \right. \right\} \quad (3)$$

Where epsilon ('ε') is a selected error value and J* is the minimum J for all modes. If encoding mode 0 is a member of the set S, then the system selects encoding mode 0 as the encoding mode that will be used to encode the pixelblock, otherwise the system selects the encoding mode M* that corresponds to $J_{M^*}$ (the encoding mode M* that yields the smallest J value).

The above steps make use of novel components as compared to the reference (non-normative) H.264 encoder. Specifically, the present invention makes use of the Huber cost function to compute distortion, modified Lagrangian multipliers, and clustering of the Lagrangian values.

The Huber cost function belongs to the class of robust M-estimators. An important property of these functions is their ability to reduce the impact of the outliers. More specifically, if any outliers exist within a pixelblock, the Huber cost function weights them less (linearly) than the mean square error function would (quadratically), in turn allowing the encoding mode selected for that pixelblock to be perhaps identical to that of the neighboring macroblocks.

The modified Lagrangian multiplier λ varies slower as a function of the quantization parameter Q and therefore places more emphasis on the distortion component of the Lagrangian J than on the bit rate component R. (In this document, 'lambda' or the lambda symbol 'λ' denotes the Lagrangian multiplier that is used in the encoding mode decision process. The multiplier that is used in the motion vector selection process is different.)

Finally, the clustering of the Lagrangian values described earlier favors encoding mode 0. Consequently, the system of the present invention allows more pixelblocks to be encoded using direct mode or skip mode for B-pixelblocks and P-pixelblocks, respectively.

Experimental Results

The video test set employed in the experiments consists of nine color video clips from movie sequences "Discovering Egypt", "Gone with the Wind", and "The English Patient". The specific characteristics of these video sequences are set forth in Table 1.

TABLE 1

Test sequences
(The abbreviations ch and Og stand for chapter and opposing glances, respectively.)

| Seq. No. | Video sequence name | Frame size | No. frames | Type |
|---|---|---|---|---|
| 1 | Discovering Egypt, ch. 1 | 704 × 464 | 58 | Pan |
| 2 | Gone with the Wind, ch. 11 | 720 × 480 | 44 | Og |
| 3 | Discovering Egypt, ch. 1 | 704 × 464 | 630 | Pan |
| 4 | Discovering Egypt, ch. 2 | 704 × 464 | 148 | Zoom |
| 5 | Discovering Egypt, ch. 3 | 704 × 464 | 196 | Boom |
| 6 | Discovering Egypt, ch. 6 | 704 × 464 | 298 | Pan |
| 7 | The English Patient, ch. 2 | 720 × 352 | 97 | Texture |
| 8 | The English Patient, ch. 6 | 720 × 352 | 196 | Og |
| 9 | The English Patient, ch. 8 | 720 × 352 | 151 | Og |

The video frames are represented in YUV format and the video frame rate is equal to 23.976 frames per second (fps) for all of the video sequences. The effectiveness of the method proposed by the present invention has been evaluated using the bit rate R of the compressed video sequences and the visual quality of the decoded video sequences. The latter is evaluated by visual inspection of the video sequences and the peak signal-to-noise ratio (PSNR) values.

The novel components in the encoding method of the present invention described in the Proposed Direct Mode Enhancement Method section complement each other in terms of their impact on the rate and distortion. The method of the present invention yields an overall bit rate reduction as well as a slight peak signal-to-noise reduction. The system of the present invention has been evaluated using two experiments that are described in the following section of text.

Fixed Quantization Parameter for All Sequences

The first experiment selects the quantization parameter Q to be the same for all of the video sequences and to be equal to Q, Q+1, Q+3 for the I-frames, P-frames, and B-frames, respectively. As set forth in Table 2, the bit rate reduction may be as high as 9% when using the encoding method of the present invention, where as the loss in peak signal-to-noise ratio (PSNR) is around 0.12 dB. No distortion is visible in the video sequences encoded using the encoding method of the present invention as compared to those encoded using the reference method.

TABLE 2

Bit rate (BR) [kbits/sec] and peak signal-to-noise ratio (PSNR) [dB] for movie sequences using the reference method and the proposed method using the same quantization parameter Q for all of the sequences.

| | Reference Method | | Proposed Method | |
|---|---|---|---|---|
| Seq. No. | Bit rate [kbits/sec] | PSNR [dB] | Bit rate [kbits/sec] | PSNR [dB] |
| 1 | 162.04 | 38.89 | 155.43 (−4.08%) | 38.75 (−0.13 dB) |
| 2 | 287.71 | 39.82 | 283.35 (−1.51%) | 39.71 (−0.11 dB) |
| 3 | 659.14 | 37.32 | 650.92 (−1.24%) | 37.20 (−0.12 dB) |
| 4 | 1029.02 | 35.84 | 1012.17 (−1.63%) | 35.76 (−0.07 dB) |
| 5 | 390.46 | 36.77 | 354.25 (−9.27%) | 39.59 (−0.18 dB) |
| 6 | 144.82 | 39.11 | 139.02 (−4.00%) | 39.02 (−0.09 dB) |
| 7 | 257.06 | 37.30 | 255.08 (−0.76%) | 37.12 (−0.18 dB) |
| 8 | 102.75 | 40.17 | 99.81 (−2.85%) | 40.03 (−0.13 dB) |
| 9 | 222.29 | 39.62 | 218.48 (−1.71%) | 39.50 (−0.12 dB |
| | Max BR Change: | | −9.27% | |
| | Min BR Change: | | −0.76% | |
| | Avg. BR Change: | | −3.00% | |
| | Max PSNR Gain: | | | 0 dB |
| | Max PSNR Loss: | | | −0.183 dB |
| | Avg. PSNR Change: | | | −0.128 dB |

The Highest Quantization Parameter for Each Sequence

To further evaluate the usefulness of the encoding method of the present invention, a second experiment was designed and conducted. A general argument when both the bit rate R and the peak signal-to-noise ratio values decrease is that, many methods, such as pre-filtering of video sequences, increasing the values of the quantizer Q, etc., can yield similar results. The goal in this experiment is to show that, when these solutions cannot be applied further without impairing the video quality unacceptably, the method of the present invention can further reduce the bit rate.

First, for each test video sequence, the bit rate is reduced as much as possible using the reference method by increasing the values of the quantization parameter until $Q_{max}+1$ when distortion becomes visible. Next, the system encodes and decodes the video sequence using $Q_{max}$ (maximum value for which distortion is not yet visible) and the reference method, yielding the bit rates and peak signal-to-noise ratio (PSNR) values included in Table 3. For each sequence, the value of $Q_{max}$ is different and it is also different for the I-frames, P-frames, and B-frames, respectively. Given this maximum achievable bit rate reduction at no visual loss, the encoding method of the present invention is then applied for encoding the sequences at the same value $Q_{max}$.

TABLE 3

Bit rate (BR) [kbits/sec] and peak signal-to-noise ratio (PSNR) [dB] for movie sequences using the reference method and the proposed method using the highest quantization parameters.

| | Reference Method | | Proposed Method | |
|---|---|---|---|---|
| Seq. No. | Bit rate [kbits/sec] | PSNR [dB] | Bit rate [kbits/sec] | PSNR [dB] |
| 1 | 512.59 | 41.39 | 479.52 (−6.45%) | 41.15 (−0.24 dB) |
| 2 | 316.70 | 40.10 | 298.86 (−5.63%) | 39.89 (−0.21 dB) |
| 5 | 238.78 | 35.74 | 210.40 (−11.33%) | 35.18 (−0.56 dB) |
| 6 | 169.28 | 39.46 | 146.75 (−13.30%) | 39.10 (−0.36 dB) |
| 7 | 300.56 | 37.78 | 290.67 (−3.28%) | 37.50 (−0.28 dB) |
| 9 | 276.91 | 40.45 | 270.56 (−2.30%) | 40.31 (−0.14 dB) |
| | Max BR Change: | | −13.30% | |
| | Min BR Change: | | −2.30% | |
| | Avg. BR Change: | | −7.04% | |
| | Max PSNR Gain: | | | 0 dB |
| | Max PSNR Loss: | | | −0.56 dB |
| | Avg. PSNR Change: | | | −0.29 dB |

As set forth in Table 3, the method of the present invention is further able to reduce the bit rate significantly by up to 13.3% for peak signal-to-noise ratio (PSNR) loss around 0.29 dB. By visual inspection of the sequences at fall frame rate (in order to evaluate any B-frame related artifacts), one can determine that this bit rate reduction does not introduce visible artifacts in the decoded video sequences. Note that, one may increase the value of the quantization parameter above $Q_{max}$ when using the method of the present invention and obtain more bit rate reduction without visual loss.

Conclusions

The present invention has proposed a method for direct mode enhancement in B-pictures and skip mode enhancement in P-pictures in the framework of the H.264 (MPEG-4/Part 10) video compression standard. The system of the present invention makes use of a Huber cost function to compute distortion, modified Lagrangian multipliers, and clustering of the Lagrangian values to select the encoding mode that will be used to encode a pixelblock. Tests have shown that significant bit rate reduction is obtained using the method of the present invention at a slight loss in peak signal-to-noise ratio (PSNR) yet with no subjective visual quality degradation. These features make the method of the present invention particularly useful for bit rate reduction in any video encoding system that employs a rate-distortion optimization framework for encoding mode decision, as an add-on when other solutions such as further increasing the values of the quantization parameter are not applicable more.

The foregoing has described a method and apparatus for performing digital image enhancement. It is contemplated that changes and modifications may be made by one of ordinary skill in the art, to the materials and arrangements of elements of the present invention without departing from the scope of the invention.

We claim:

1. A non-transitory computer readable medium storing a computer program for selecting an encoding mode from a plurality of encoding modes that includes mode 0 encoding and non-mode 0 encoding, the computer program executable by at least one processor, the computer program comprising sets of instructions for:

computing, for each particular encoding mode from the plurality of encoding modes, a Lagrangian value that quantifies a relationship between a distortion and a bit rate for the particular encoding mode;

identifying a set of encoding modes from the plurality of encoding modes by comparing (i) a ratio between a smallest Lagrangian value and the computed Lagrangian value of each encoding mode in the plurality of encoding modes with (ii) a threshold value; and selecting, from the set of encoding modes, the mode 0 encoding when the set of encoding modes comprises the mode 0 encoding, even if the Lagrangian value associated with the mode 0 encoding is not the smallest Lagrangian value.

2. The non-transitory computer readable medium of claim 1, wherein the set of instructions for identifying the set of encoding modes is for favoring the selection of mode 0 encoding.

3. The non-transitory computer readable medium of claim 2, wherein the mode 0 encoding is a direct mode encoding.

4. The non-transitory computer readable medium of claim 2, wherein the mode 0 encoding is a skip mode encoding.

5. The non-transitory computer readable medium of claim 1, wherein the mode 0 encoding is an encoding mode that does not transmit motion vector information.

6. The non-transitory computer readable medium of claim 1, wherein the computer program further comprises a set of instructions for, selecting, from the set of encoding modes, an encoding mode associated with the smallest Lagrangian value when the mode 0 encoding is not in the set of encoding modes.

7. The non-transitory computer readable medium of claim 1, wherein the set of instructions for computing the Lagrangian value comprises a set of instructions for computing the Lagrangian value based on a distortion value, a bit rate value and a Lagrangian multiplier.

8. The non-transitory computer readable medium of claim 1, wherein the mode 0 encoding is an encoding mode that uses an interpolative motion vector without requiring a correction difference for interpolative motion vector.

9. A method for selecting an encoding mode from a plurality of encoding modes that includes mode 0 encoding and non-mode 0 encoding, the method comprising:

for each particular encoding mode from the plurality of encoding modes, computing a Lagrangian value that quantifies a relationship between a distortion and a bit rate for the particular encoding mode;

identifying a set of encoding modes from the plurality of encoding modes by comparing (i) a ratio between a smallest Lagrangian value and the computed Lagrangian value of each encoding mode in the plurality of encoding modes with (ii) a threshold value; and selecting the mode 0 encoding from the set of encoding modes when the set of encoding modes comprises the mode 0 encoding, even if the Lagrangian value associated with the mode 0 encoding is not the smallest Lagrangian value.

10. The method of claim 9 wherein identifying the set of encoding modes is for favoring the selection of mode 0 encoding.

11. The method of claim 10, wherein the mode 0 encoding is a direct mode encoding.

12. The method of claim 10, wherein the mode 0 encoding is a skip mode encoding.

13. The method of claim 9, wherein the mode 0 encoding is an encoding mode that does not transmit motion vector information.

14. The method of claim 9 further comprising selecting an encoding mode associated with the smallest Lagrangian value from the set of encoding modes when the mode 0 encoding is not in the set of encoding modes.

15. The method of claim 9, wherein the Lagrangian value is computed based on a distortion value, a bit rate value and a Lagrangian multiplier.

16. The method of claim 9, wherein the mode 0 encoding is an encoding mode that uses an interpolative motion vector without requiring a correction difference for interpolative motion vector.

* * * * *